July 8, 1924.

J. C. BALL 1,500,663

METHOD AND MEANS FOR REPLACING BATTERY POSTS AND THREADS

Filed Jan. 6, 1923    2 Sheets-Sheet 1

WITNESSES
Guy M Spring
George W Vaght

Inventor
J. CLOPTON BALL

By Richard B Owen
Attorney

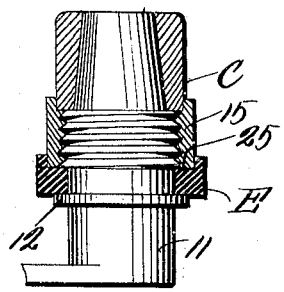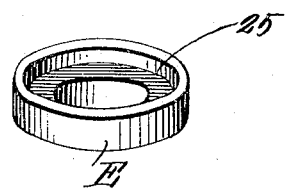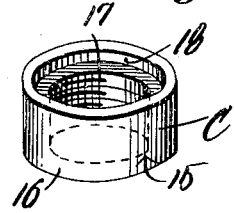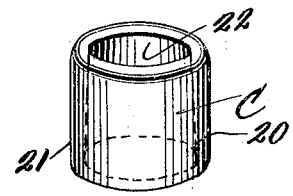

Patented July 8, 1924.

1,500,663

UNITED STATES PATENT OFFICE.

JOSEPH CLOPTON BALL, OF KINSALE, VIRGINIA.

METHOD AND MEANS FOR REPLACING BATTERY POSTS AND THREADS.

Application filed January 6, 1923. Serial No. 611,191.

*To all whom it may concern:*

Be it known that I, JOSEPH CLOPTON BALL, a citizen of the United States, residing at Kinsale, in the county of Westmoreland and State of Virginia, have invented certain new and useful Improvements in Methods and Means for Replacing Battery Posts and Threads, of which the following is a specification.

This invention relates to means for replacing worn or mutilated battery posts in a convenient and expeditious manner and the primary object of the invention is to provide a novel method for removing the worn or mutilated posts and replacing the same without necessitating the removal of the battery jar cover or disturbing the battery plates.

In storage batteries, the terminal posts of the battery often become unfit for use, and the threads become mutilated, thus necessitating the opening of the battery and disassembling the groups of plates, cutting off the plates from the old plate straps and burning (welding) them on to the new plate straps. The plate strap proper is that portion of metal which the plates are burned on to and hold them spaced at the right distance, but is always made cast in one piece with post and threads and the whole thing called a plate strap. This invention contemplates the novel method of replacing worn battery posts by simply sawing or cutting with a pair of end cutters the worn or mutilated post close off to the battery jar cover and then providing novel mold members for permitting a new post to be molded directly onto the cut off battery post, the mold members being so constructed as to cast the threads directly on the new post being formed.

A further object of the invention is the provision of a sectional mold for forming new battery posts for storage batteries, one of said sections including a base member for forming the base of the posts and the threads thereon and the other section including means for forming the stems of the posts for receiving the terminal caps carried by the line wires.

With these and other objects in view, the invention consists in the novel construction, arrangement and formation of parts, as will be hereinafter more specifically described, claimed and illustrated in the accompanying drawings, forming a part of this specification, in which drawings:

Figure 5 is a section similar to Figure 4 showing the novel gasket or third mold section in position for permitting the molding of a new post when the battery as been disassembled.

Figure 6 is a detail perspective view of the novel washer or third mold section.

Figure 7 is a detailed perspective view of the base portion of the mold.

Figure 8 is a detailed perspective view of the upper or outer section of the mold.

Figure 1:
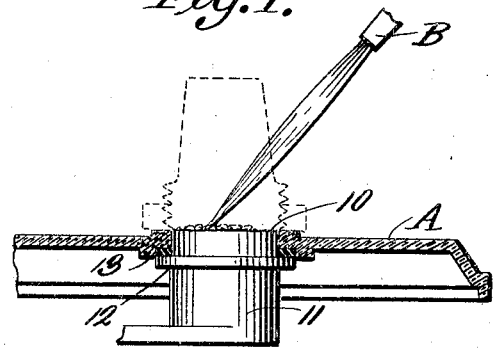
Figure 1 is a fragmentary sectional view through a battery showing the first step in preparing the battery posts for permitting the new post to be molded thereon.
Figure 2:
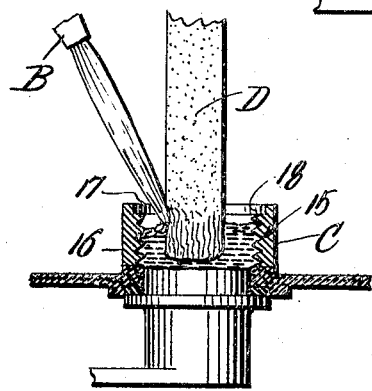
Figure 2 is a similar view showing the second step for forming the base portion of the new post.
Figure 4:
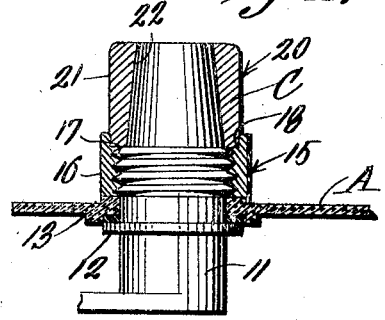
Figure 4 is a similar view showing the completed post prior to the moving of the mold section.
Figure 3:
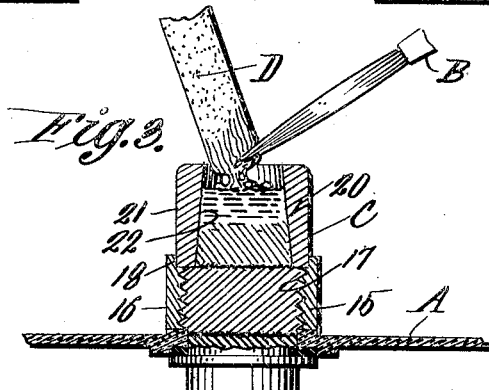
Figure 3 is a similar view showing the third step with the second mold section in position for forming the body portion of the new post.

Referring to the drawings in detail, wherein similar reference characters designate corresponding parts throughout the several views, the letter A indicates a battery jar cover having an opening 10 therein for the reception of a battery post 11. The post 11 adjacent to the inner end thereof is provided with the usual annular shoulder 12 on which rests the annular gasket 13 adjacent with the inner surface of the cover A. When the threads on the post become mutilated or worn through any reason, the post 10 is sawed off or cut off close to the cover A, as clearly shown in Figure 1 of the drawings. In carrying out my improved method for replacing the posts, I take the base section 15 of a novel mold C, which forms a vital part of my invention and place the same on the cover A around the remaining portion of the post 11.

This base section 15 of the novel mold C includes essentially an annular body 16 formed of the desired material such as steel and this body has formed on the inner surface thereof threads 17 of the desired pitch for forming threads on the outer surface of the new post to be made. The annular body 16 adjacent to the outer end thereof and directly above the threads 17 is provided with an annular seat 18 for the reception of the outer section 20 of the novel mold C.

This mold section 20 is formed relatively higher than the section 15 and also includes an annular open body 21 having an enlarged tapered bore 22 for forming the usual tapered body portion of a battery post. The outer diameter of the body 21 is such as to permit the same to snugly fit on the annular seat 18 whereby movement between the sections 20 and 15 will be precluded, when the same are used, as will be hereinafter more fully described.

After the section 15 has been placed in position as described, I take the blow torch B, which can of course be of the ordinary construction but preferably the oxy-acetylene. Hold the torch in the right hand and direct the flame on the center of the remaining portion of post 11. As soon as the whole end of the post 11 begins to melt freely I put one end of lead stick D, which is held in the left hand, directly into the melting metal and hold it there until the section 15 is filled about to the top of the threads but shaking the lead stick D back and forth all the time to break up the oxide which forms so rapidly on melting lead. This breaking up of the oxide will allow the melted lead to freely enter and fill up the threads 17 on the inner surface of the mold section 15 and thus insure the forming of the threads on the base portion of the post. After the base portion of the post has been formed the outer mold section 20 is placed on the annular seat 18 as described. I then again start the lead to melting freely in section 15 with blow torch B and add lead stick D as before. After the mold section has been filled with the metal to the desired height, the metal is smoothed off and the upper end thereof can be stamped with suitable legend to indicate whether the post is negative or positive.

After the new post has become cooled and in a solidified condition the upper section of the mold 20 is first removed and then the lower section 15 is unthreaded from the post. This leaves a new post in position of the exact formation of an old post and of equal strength. The lower section 15 can have its outer surface made polygonal-shaped, if so desired, so that the same can be readily engaged by a wrench to permit the easy unthreading thereof from the new post.

It is to be understood that the section 20 can have the bore thereof made in different sizes, for positive and negative posts, as usually the negative post is slightly smaller in diameter than the positive post.

When it is desired to mold a new post, when the battery has been disassembled for other purposes such as reinsulating a third mold section or gasket E is utilized. The upper surface of this third mold section or washer E is provided with an internal annular shoulder 25 at its upper end, which forms a convenient seat for receiving the lower mold or base section 15 of the mold C as heretofore described.

When this third mold section E is used, the same is slipped on the post 11 into engagement with the annular flange 12 formed on the post after which the mold section 15 is placed in the annular seat of the third mold section and the post molded on as heretofore described.

From the foregoing description it can be seen that a novel and simple means has been provided for forming new battery posts without displacing the jar covers.

Changes in details may be made without departing from the spirit or scope of this invention.

What I claim as new is:

1. The method of replacing mutilated storage battery posts consisting of sawing off the worn battery post close to the battery jar cover, placing a mold around the remaining portion of the post, placing molten metal in the mold, and removing the mold after the metal has become solidified.

2. The method of replacing mutilated storage battery posts consisting of sawing off the worn battery post close to the battery jar cover, placing a mold around the remaining portion of the post, melting the upper portion of the post, and then placing molten metal in the mold in engagement with the melted surface of the remaining portion of the post.

3. The method of replacing mutilated storage battery posts consisting of sawing off the worn battery post close to the battery jar cover, placing a mold section having threads on the inner surface thereof around the remaining portion of the post, melting the upper surface of the remaining portion of the post, placing molten metal in the mold section and puddling the same in position, placing a second tapered mold section on the first mold section, and placing molten metal in the second mold section.

4. A device for replacing mutilated storage battery posts comprising a pair of independent mold sections adapted to be placed in position one at a time.

5. A device for replacing mutilated battery posts after the mutilated battery post has been sawed off close to the battery jar cover including a pair of mold sections, one of said mold sections including an annular body having threads formed on the inner surface thereof and adapted to be placed around the battery post and having a seat formed on its upper end, the other section including an annular body having its surface tapered and adapted to fit upon the seat formed on the first mold section.

6. A device for replacing worn battery posts comprising a pair of independent mold sections one of the sections including an annular body having its inner surface provided with threads and its upper surface provided with a seat, the other section including an elongated annular body having a tapered bore, the lower end of the body of the outer section being adapted to fit on said seat in the first mentioned section.

7. A device for replacing a cut off portion of a battery post comprising a supporting member adapted to rest upon a portion of the post having an annular seat formed therein and a pair of independent mold sections for seating one upon the other and for resting on said annular seat.

8. A device for replacing worn battery posts comprising a supporting gasket having an annular seat formed in its upper surface, a lower mold section adapted to rest upon said seat having its inner surface provided with threads and its upper surface provided with a seat, and an outer mold section including an elongated annular body having a tapered bore adapted to fit upon the seat formed in the upper surface of the lower mold section.

In testimony whereof I affix my signature in presence of two witnesses.

JOSEPH CLOPTON BALL.

Witnesses:
J. C. Moss,
H. C. Moss.